No. 739,053. PATENTED SEPT. 15, 1903.
L. BIAVA.
VEHICLE WHEEL.
APPLICATION FILED NOV. 28, 1902.
NO MODEL.

Witnesses
Chas. H. Davids
J. Clark Pybas

Louis Biava,
Inventor,
By his Attorney,
J. R. Littell

No. 739,053.

Patented September 15, 1903.

UNITED STATES PATENT OFFICE.

LOUIS BIAVA, OF NEW YORK, N. Y.

VEHICLE-WHEEL.

SPECIFICATION forming part of Letters Patent No. 739,053, dated September 15, 1903.

Application filed November 28, 1902. Serial No. 133,079. (No model.)

*To all whom it may concern:*

Be it known that I, LOUIS BIAVA, a subject of the King of Italy, residing at New York, in the county and State of New York, have invented certain new and useful Improvements in Vehicle-Wheels, of which the following is a specification.

My invention relates to wheels for vehicles, and especially refers to such a construction thereof as will enable said wheels to effectually cushion the vehicle against the shock resulting from its propulsion over rough or uneven roads or surfaces, in this respect obviating the use of pneumatic or other similar tires.

The invention possesses none of the specific defects of pneumatic tires, inasmuch as its efficacy cannot be affected by the sharp edges or points of articles—such as bits of glass, carpet-tacks, nails, &c.—which frequently deprive such tires of their resiliency by reason of incisions or punctures made therein.

Figure 1:
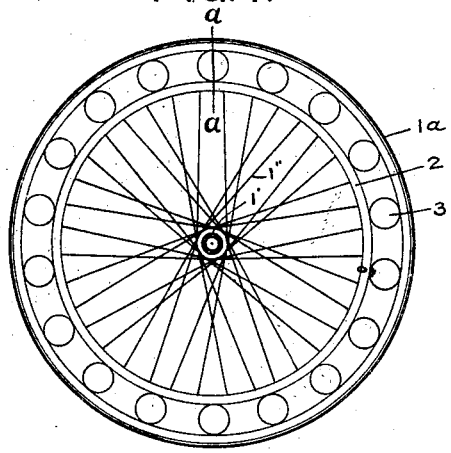
Figure 2:
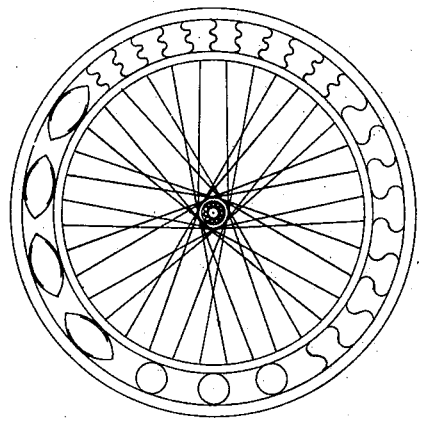
Figure 3:
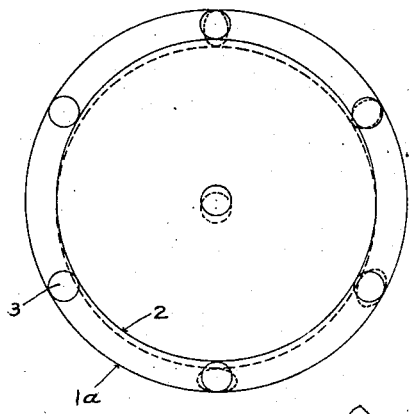
Figure 4:
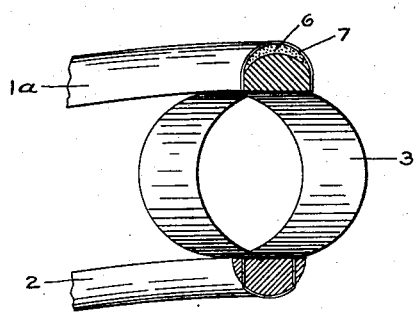
Figure 5:
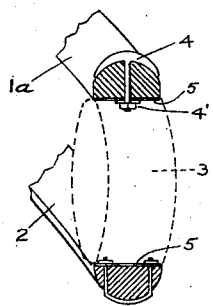
Figure 6:
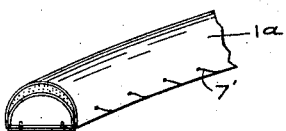

In the drawings, Figure 1 is a side elevation of my improved wheel. Fig. 2 is a similar view showing modifications of my invention. Fig. 3 is a diagram illustrative of the effects resulting from the use of my improved wheel. Fig. 4 is a partial transverse vertical section in perspective through the line $a\,a$, Fig. 1; and Figs. 5 and 6 are detail views.

Corresponding parts in all the figures are denoted by the same reference characters.

Referring to the drawings, 1 designates a wheel whereof the hub 1', spokes 1'', and rim 1$^a$ may be of common and well-known forms, the spokes 1'' being in this instance attached to an auxiliary rim or ring 2, which is positioned interiorly of the true rim or felly 1$^a$ and attached to the latter by means of resilient metallic members or springs 3. Said springs 3 may be of any suitable form or design—such, for instance, as are shown in Fig. 2; but I prefer such as are shown in Figs. 1 and 3, formed of thin steel properly tempered and circular in cross-section, and they may have continuous peripheries, or the latter may be divided axially and the divided ends may be lapped one upon the other. It should be particularly noted that, as shown by reference to Fig. 3, in order to obtain the desired results from my invention it is essential that the rim or felly 1$^a$ should be radially rigid—that is to say, in the direction of the plane of rotation of the wheel 1—and that therefore each of the springs 3 will assist in supporting any load which may be imposed upon the hub 1'. The springs may be attached both to the auxiliary rim or ring 2 and the true rim or felly 1$^a$ by any suitable means; but I prefer to use for that purpose, especially in connection with wooden rings and fellies, clip-headed screws 4, secured by nuts 4', as shown in Fig. 5. Spring-seats 5, separable from the springs and preferably made of metal, may be interposed between the springs 3 and the rings 2 between the former and the felly 1$^a$, where said ring and felly are constructed of wood. The periphery of the felly 1$^a$ is preferably convex in cross-section, and a strip 6, preferably of soft rubber, is placed around said periphery and is secured in place by a band or tire 7, preferably of rubber-coated canvas, having transversely-perforated edges, the edges or angles of the felly being similarly perforated. Thongs of leather or wire passed alternately through the perforations in the tire 7 and in the felly 1$^a$ serve to draw the former tightly across the soft-rubber strip 6 and to securely fasten it in position. (See more particularly Fig. 6.) It is quite evident that various other means within the scope of my invention may be used for the purpose mentioned; but I prefer those above described. The metallic spring-seats may, if required, be at first attached to the felly 1$^a$ and ring 2 separately from the springs 3 by means of screws or in any other suitable manner, and the springs 3 may afterward be attached to the felly 1$^a$ and ring 2 diametrally in alinement with said spring-seats 5.

The uses and advantages of my invention will be readily understood. A vehicle-wheel embodying the improvements herein set forth will possess the resilience of the tempered steel springs 3, the latter retaining practically their cylindrical or unflexed form until pressure be applied, as by weight carried on a vehicle, when they will severally assume oval or flexed forms, such as shown in broken lines in Fig. 3. Thus, as before noted, all of the springs 3 functionally assist each other, and should one or even more of them become broken or prove to be defective the remaining springs 3 may prove to be sufficient for their combined functional purpose, my invention embodying in this respect an important improvement upon wheels which have flexible rims. Furthermore, the radial rigidity of the felly or true rim 1ª prevents the flattening of the latter at the part thereof which contacts the ground, thereby insuring a lighter running of the wheel of my invention than of the wheels which have flexible rims and which therefore necessarily contact the ground throughout a relatively great distance, whether the vehicle be or be not in motion.

I am aware that wheels have been constructed hitherto having an inner ring and an outer ring with springs interposed therebetween; but the outer ring in such wheels has invariably been not merely preferably but essentially a radially-flexible member, thus in the use of said wheels including the disadvantages which are specifically precluded by the use of my invention. In view of such former construction of wheels, however, I do not claim, broadly, a wheel of the form last described, but only such as is covered by the specific form of my invention as set forth in the following claims. The rubber tire 7, backed by the soft-rubber strip 6, will form a resilient tread for the wheel and will be of such a nature as to resist shock caused by the passage of the wheel over minor obstacles and will also possess the function of so engaging a road-surface as to effectually prevent the slipping of the wheel thereon. The spring-seats 5, formed separably from the springs 2, take the thrust of the latter, and thus prevent them from chafing the ring 2 or felly 1ª.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly fall within the scope of my invention and the terms of the following claims.

Having thus described my invention, I claim and desire to secure by Letters Patent—

1. A vehicle-wheel comprising a ring attached to the outer ends of the spokes, a radially-rigid felly having a rounded outer surface attached to the ring by interposed springs, a transversely-flexible tire attached to and bent over the rounded edge of the felly, and a soft-rubber strip interposed between the felly and the tire.

2. A vehicle-wheel comprising a ring attached to the outer ends of the spokes, a radially-rigid felly having a rounded outer surface attached to the ring by interposed springs, a transversely-flexible tire attached to and bent over the rounded edge of the felly, and a soft-rubber strip interposed and compressed between the felly and the tire.

3. A vehicle-wheel comprising a ring attached to the outer ends of the spokes, a radially-rigid felly having a rounded outer surface attached to the ring by interposed cylindrical springs, a transversely-flexible tire attached to and bent over the rounded edge of the felly, means for securing the edges of the tire to the felly, and a soft-rubber strip interposed between the felly and the tire.

In testimony whereof I have signed my name in the presence of the subscribing witnesses.

LOUIS BIAVA.

Witnesses:
CHAS. H. DAVIDS,
J. C. PYBAS.